July 24, 1951 J. W. HAMMER 2,561,696
DISPENSING AND MEASURING DEVICE FOR GRANULAR MATERIALS
Filed June 27, 1949
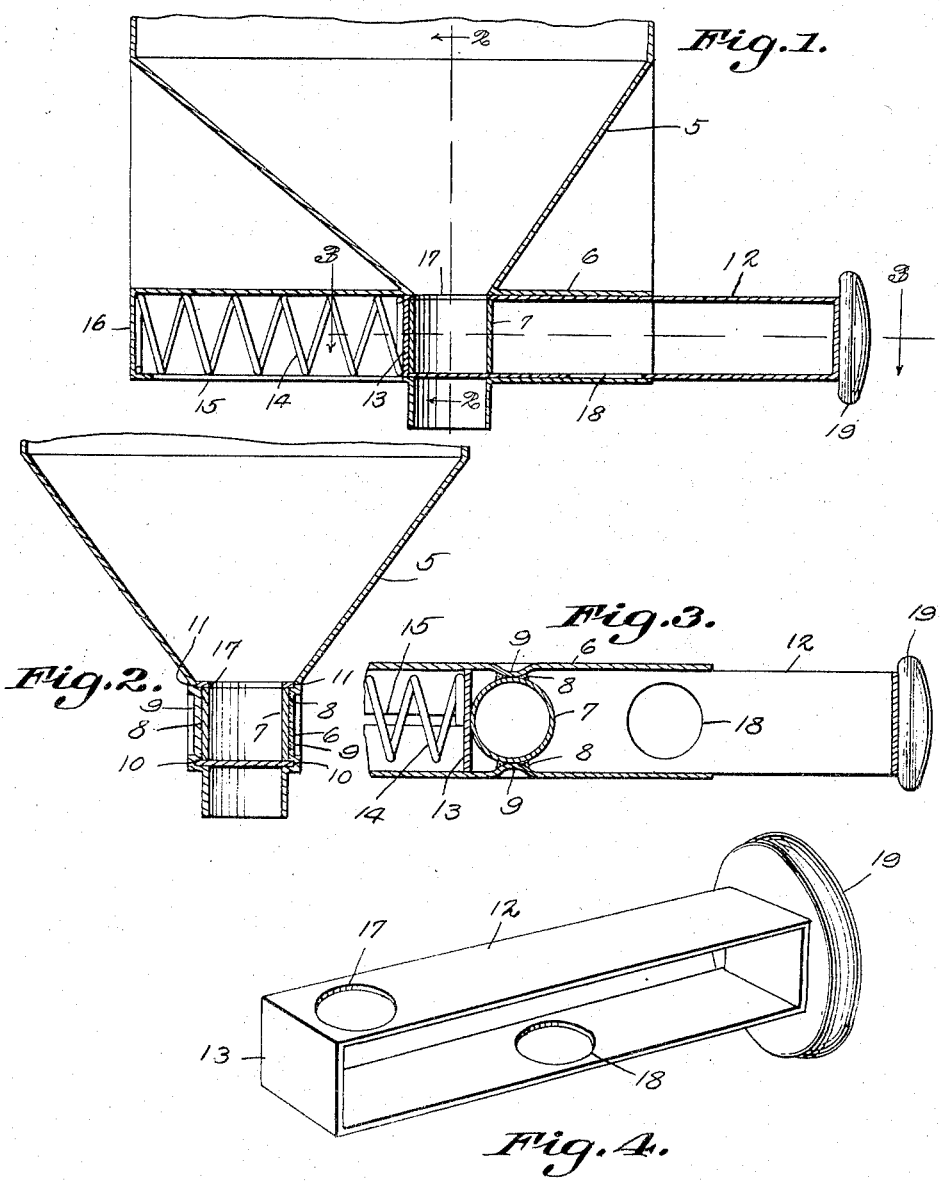
J. W. Hammer
INVENTOR
BY C. A. Snow & Co.
ATTORNEYS.

Patented July 24, 1951

2,561,696

UNITED STATES PATENT OFFICE 2,561,696

DISPENSING AND MEASURING DEVICE FOR GRANULAR MATERIALS

James W. Hammer, Freeland, Mich.

Application June 27, 1949, Serial No. 101,589

1 Claim. (Cl. 222—449)

This invention relates to a device for dispensing measured quantities of granular materials, such as salt, sugar, coffee, baking powder or the like.

An important object of the present invention is to provide a device of the type stated which can be formed on the lower end of a conventional container or hopper such as found in kitchen cabinets, whereby the device formed on the lower end of said hopper can be used to dispense a measured quantity of the material contained within the hopper, directly into a bowl or other receptacle.

Another important object is to provide a device as stated which is capable of manufacture at relatively low cost, and which comprises few parts arranged simply and in a manner whereby they will not readily get out of order.

Another important object is to provide a device of the character described which will not clog with the material dispensed, despite regular use over a long period of time.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a vertical section through the lower end of a hopper, and through a device constructed in accordance with the invention and mounted on the lower end of said hopper.

Fig. 2 is a transverse section on line 2—2 of Fig. 1.

Fig. 3 is a longitudinal section on line 3—3 of Fig. 1.

Fig. 4 is a perspective view of a plunger embodied in the invention.

Referring to the drawings in detail, 5 designates a conventional hopper having the usual tapered bottom, and at the bottommost portion of said hopper there is formed the plunger tube 6 extending in opposite directions from the bottom opening of said hopper, said bottom opening being provided by the depending spout 7 extending downwardly through the horizontal tube 6 as best seen in Fig. 3, and secured at opposite sides thereof to the side walls of the tube as by solder 8 or any other suitable fastening means. At the diametrically opposite points to which the spout 7 is connected to the tube 6, the tube can be indented as at 9, and provided (see Fig. 2) with the diametrically opposed guide slots 10 and diametrically opposed guide recesses 11 in which are slidably mounted the upper and lower portions of an elongated plunger 12 the sides of which are open, and which is formed with the closed inner end wall 13. Abutting against the inner end wall 13 is one end of a compression spring 14, the other end of which abuts against the closed rear end 16 of the tube 6, the tube being formed with longitudinal slot 15 underlying the spring so as to permit any particles which may find their way into the spring compartment, to gravitate through the slot, thus to keep said spring compartment clear of particles and to prevent clogging.

As may be noted from Fig. 4, the plunger comprises parallel spaced upper and lower horizontal and longitudinally extended members, the upper member being formed adjacent its rear end with an opening 17 adapted to register with the spout 7 in one position of the plunger, while the lower member is formed intermediate its ends with an opening 18 also adapted to register with the spout 7 in another position of the plunger, said openings 17 and 18 being spaced longitudinally of the plunger.

Normally, the spring 14 will hold the plunger in the position illustrated in Fig. 1, in which position the opening 17 formed in the top of the plunger is in register with the spout 7, while the opening 18 is out of register with said spout. In this position, material will gravitate from the hopper 5 into the spout 7, and a measured quantity of said material will be defined between the upper and lower members of the plunger and will be held by the bottom member of the plunger from gravitation through the normally open lower end of the spout 7.

Assuming that it is desired to dispense said measured quantity of material, it is necessary only that the user press the push button 19 formed on the outer end of the plunger, to the full extent to which said plunger can be forced against the action of the spring 14. As will be seen from Fig. 1, after the plunger 12 has been forced inwardly to a prescribed extent, the knob or button 19 will come against the front end of the tube 6 and will prevent further movement. At the time the knob 19 comes against the front end of the tube 6, the opening 18 will be in register with the spout 7, and thus, the material which has previously been measured and held within the spout will be permitted to gravitate through the now open bottom end of said spout. At the same time, the upper member of the plunger 12 will of course also have been moved to a point where the opening 17 formed therein is out of register with the spout, so that an imperforate portion of said upper member is presented to the bottom of the hopper, thus holding all the other material within the hopper while dispensing the measured quantity.

On release of the push button 19, the spring 14 will return the plunger to the normal position illustrated in Fig. 1, and another measured quantity of material will gather within the spout 7, as will be readily understood.

What is claimed is:

A device for dispensing and measuring quantities of granular material comprising a hopper having a tapered bottom; a tubular spout formed open at both ends and depending from the bottom of the hopper; a horizontally extending tube of rectangular cross section rigidly secured to the hopper, said tube being closed at its rear end and open at its front end, the spout extending downwardly through the middle portion of the tube and having its side wall rigidly secured to opposite side walls of the tube at diametrically opposite locations on said spout, the tube having longitudinal guide slots formed in its bottom portion and extending longitudinally of the opposite side edges of said bottom portion of the tube, there being longitudinal guide recesses formed in the opposite sides of the top portion of the tube; a plunger slidable in the tube, said plunger having a push button at one end and having its other end closed and disposed between the spout and closed end of the tube, said plunger having open sides and including parallel longitudinally extended top and bottom members the side edges of which are disposed within said recesses and slots respectively, there being an opening formed in the top member of the plunger and an opening formed in the bottom member of the plunger, said openings being staggered longitudinally of the plunger whereby in one position of the plunger the top opening will register with the top end of the spout and in another position of the plunger the bottom opening will register with the bottom end of the spout; and a compression spring disposed in the tube and abutting at opposite ends against the closed rear end of the tube and the closed rear end of the plunger respectively, said spring normally pressing the plunger to the first-named position, the spout engaging the closed rear end of the plunger in said first-named position to provide a stop limiting movement of the plunger beyond said first named position.

JAMES W. HAMMER.

REFERENCES CITED

The following references are of record in the file of this patent:

UNITED STATES PATENTS

| Number | Name | Date |
|---|---|---|
| 1,430,935 | Bright | Oct. 3, 1922 |
| 2,041,887 | Ward | May 26, 1936 |